(12) United States Patent
Chao

(10) Patent No.: US 7,636,129 B2
(45) Date of Patent: Dec. 22, 2009

(54) METHOD AND DEVICE FOR DETECTING SAWTOOTH ARTIFACT AND/OR FIELD MOTION

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 1009 days.

(21) Appl. No.: 10/904,454

(22) Filed: Nov. 11, 2004

(65) Prior Publication Data

US 2005/0117067 A1    Jun. 2, 2005

(30) Foreign Application Priority Data

Nov. 13, 2003    (TW) .............. 92131835 A

(51) Int. Cl.
*H04N 5/14* (2006.01)
*H04N 9/64* (2006.01)

(52) U.S. Cl. ..................... 348/700; 348/452
(58) Field of Classification Search .................. 348/700
See application file for complete search history.

(56) References Cited

U.S. PATENT DOCUMENTS

| | | | |
|---|---|---|---|
| 5,153,719 A * | 10/1992 | Ibenthal | 348/699 |
| 5,291,280 A | 3/1994 | Faroudja et al. | |
| 5,625,421 A | 4/1997 | Faroudja et al. | |
| 5,631,706 A * | 5/1997 | Tsunashima | 348/452 |
| 5,689,301 A | 11/1997 | Christopher et al. | |
| 5,861,924 A * | 1/1999 | Pan et al. | 348/451 |
| 6,014,182 A * | 1/2000 | Swartz | 348/700 |
| 6,201,577 B1 | 3/2001 | Swartz | |
| 6,580,463 B2 | 6/2003 | Swartz | |
| 2002/0008785 A1 * | 1/2002 | Yamaguchi et al. | 348/699 |
| 2003/0095205 A1 * | 5/2003 | Orlick et al. | 348/448 |
| 2005/0078215 A1 * | 4/2005 | Swartz | 348/452 |
| 2005/0117067 A1 | 6/2005 | Chao | |
| 2005/0219408 A1 * | 10/2005 | Yang et al. | 348/441 |

FOREIGN PATENT DOCUMENTS

| | | |
|---|---|---|
| CN | 1071074 C | 9/2001 |
| EP | 0687105 A2 | 12/1995 |

\* cited by examiner

*Primary Examiner*—Marsha D Banks Harold
*Assistant Examiner*—Jessica Roberts
(74) *Attorney, Agent, or Firm*—Winston Hsu

(57) ABSTRACT

An apparatus includes a pixel detector for generating a comparison value according to a target pixel in a first field and comparing pixels in a second field, a counting device for generating a count value according to the comparison values, and a decision circuit for generating a decision value according to the count value from the counting device.

20 Claims, 6 Drawing Sheets

METHOD AND DEVICE FOR DETECTING SAWTOOTH ARTIFACT AND/OR FIELD MOTION

BACKGROUND OF INVENTION

1. Field of the Invention

The invention relates to an apparatus for detecting video signals, and more particularly, to a device for detecting sawtooth artifact and/or field motion of video signals.

2. Description of the Prior Art

In interlaced scan, odd scan lines and even scan lines of a frame are scanned in sequence. Thus, each frame is actually composed of an even field and an odd field.

In progressive scan, the two fields are combined into one frame, and then the frame is scanned at double horizontal scan frequency in sequence, so that the quality of the display image is improved.

Because a time difference exists between different fields, when combining two fields into one frame, it is important to detect whether there is image motion between the two fields to be combined, that is, whether there is field motion. If field motion exists, a sawtooth artifact appears in the frame after combining two fields, and the quality of the image decreases.

However in the prior art, the method for detecting field motion and the method for detecting the sawtooth artifact are different (cf. U.S. Pat. No. 6,580,463). Furthermore these methods are actually too complicated to implement.

SUMMARY OF INVENTION

It is therefore an objective of the claimed invention to provide a device for detecting sawtooth artifact and/or field motion.

According to an embodiment of the invention, an apparatus is disclosed comprising a pixel detector for comparing a target pixel in the first field and a plurality of comparing pixels in the second field to generate a comparison value corresponding to the target pixel; a counting circuit coupled to the pixel detector for generating a count value according to the comparison values corresponding to the pixels in the first field; and a decision circuit coupled to the counting device, for generating a decision value according to the count value.

According to another embodiment of the invention, a method for detecting video data is disclosed comprising: comparing a target pixel in a first field and a plurality of corresponding comparing pixels in a second field to generate a plurality of comparison results; generating a comparison value corresponding to the target pixel according to the comparison results; generating a count value corresponding to the first field according to the comparison values of the pixels in the first field; and generating a decision value according to the count value.

These and other objectives of the present invention will no doubt become obvious to those of ordinary skill in the art after reading the following detailed description of the preferred embodiment that is illustrated in the various figures and drawings.

DETAILED DESCRIPTION

In the embodiment of the present invention to be described, analog processing, digital processing, hybrid of analog and digital processing and software technology can be applied for digital signal processing.

Figure 1:
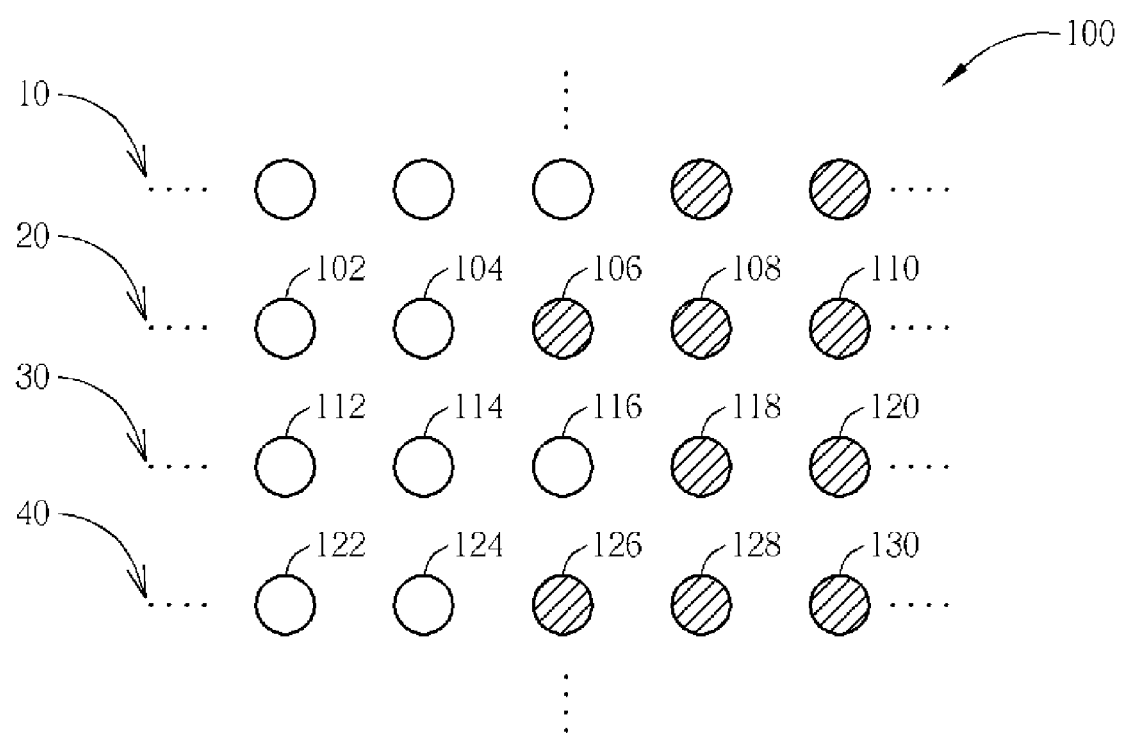
FIG. 1 illustrates a frame.

Please refer to FIG. 1 showing a frame 100. The frame 100 is composed of a first field $F_n$ and a second field $F_{n-1}$. The first field $F_n$ includes horizontal lines 10, 30, etc. The second field $F_{n-1}$ includes horizontal lines 20, 40, etc. The line 20 includes pixels 102, 104, . . . 110. The line 30 includes pixels 112, 114, . . . 120. The line 40 includes pixels 122, 124, . . . 128, 130.

Figure 2:
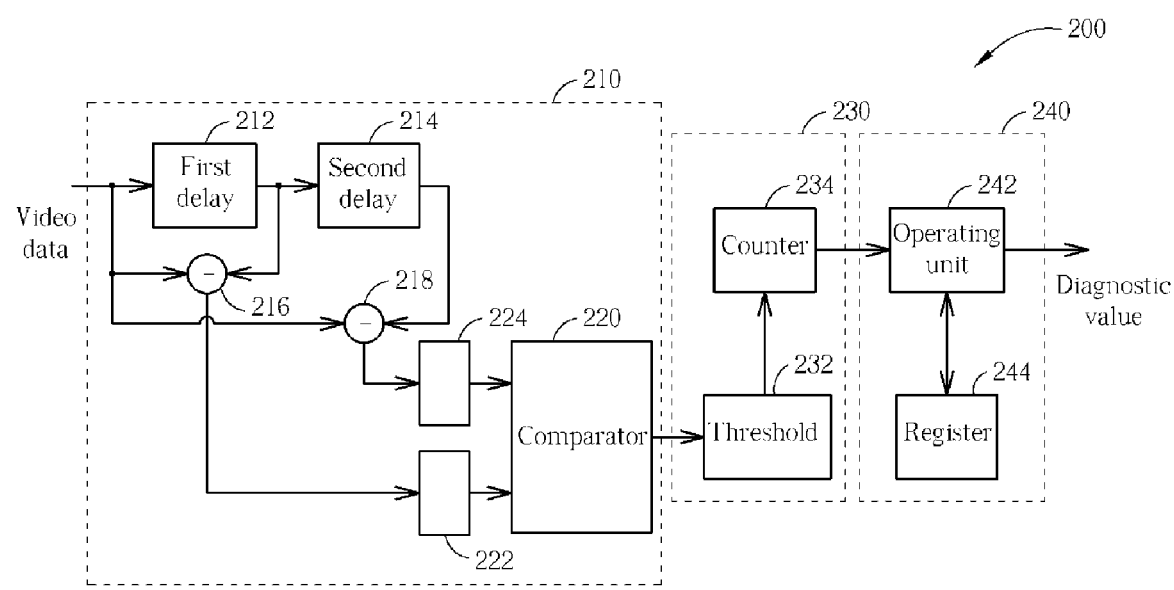
FIG. 2 illustrates the video signal detector according to the invention.

Please refer to FIG. 2 showing a video signal detector 200 according to the present invention. The video signal detector 200 includes a pixel detector 210, a counting device 230, and a decision circuit 240. In an embodiment, the pixel detector 210 includes delays 212, 214, subtracters 216, 218, and a comparator 220. A low pass filter can be attached to the pixel detector 210 to filter noise, for example, attach a low pass filter at a video data input end, or couple a first low pass filter 222 and a second low pass filter 224 respectively between the first subtracter 216 and the comparator 220, and the second subtracter 218 and the comparator 220 as shown in FIG. 2. The number and position of the low pass filters can be configured as required. The video data received by the pixel detector 210 can be monochrome video data or analog or digital component video signals such as RGB, Y/I/Q, Y/U/V, Y/R-Y/B-Y, Y/Cr/Cb etc. The first delay 212 and the second delay 214 are for temporarily storing previous video data, in order to provide video data delayed for N or N+1 scan lines, wherein N is adjustable according to the format of the video data, e.g. N is 262 in NTSC, 312 in PAL. If the current video data flow input into the pixel detector 210 is the target scan line 30 in the first field $F_n$ shown in FIG. 1, the data flow provided by the first delay 212 is the scan line 40 in the second field $F_{n-1}$, and the data flow provided by the second delay 214 is the scan line 20 in the second field $F_{n-1}$. As known by a person skilled in the art, other software, hardware, or hybrid technology of software and hardware can also be applied in the present invention.

Figure 3:
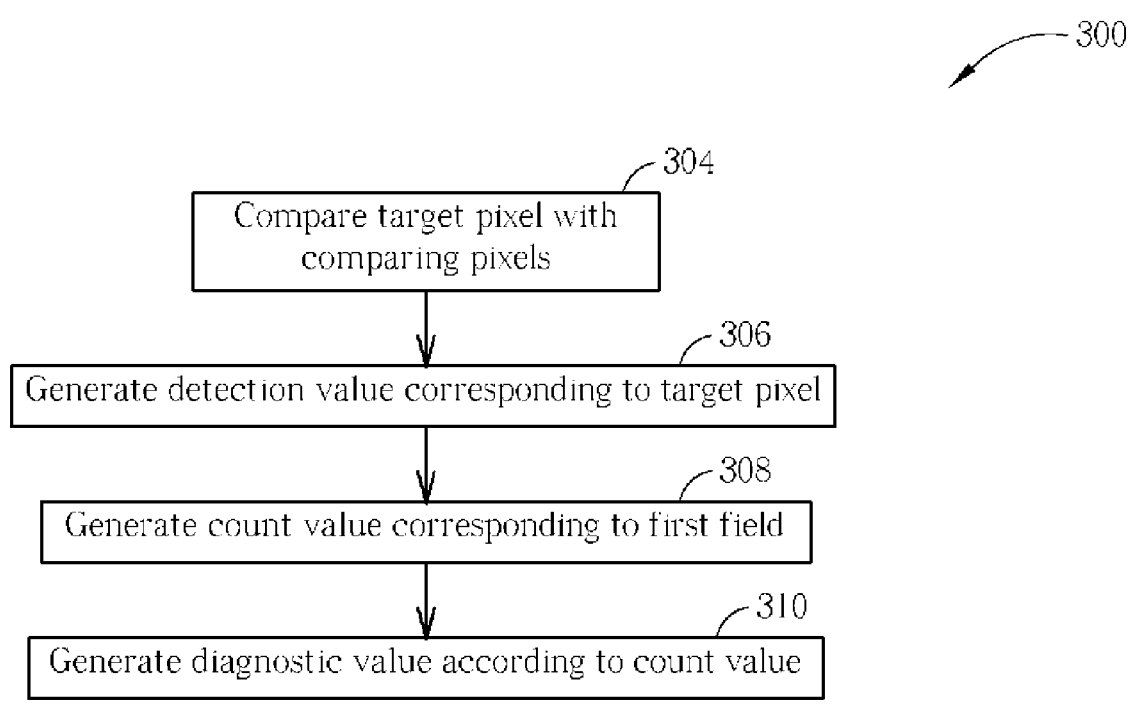
FIG. 3 is a flowchart of the method according to the invention.

The operation of the video signal detector 200 is described by the flowchart 300 shown in FIG. 3:

Step 304: The subtracters 216, 218 compare a target pixel of the first field with a plurality of comparing pixels of the first scan line and the second scan line corresponding to the target scan line in the second field.

Step 306: The comparator 220 generates a comparison value corresponding to the target pixel according to the comparison results.

Step 308: The counting device 230 generates a count value corresponding to the first field according to all the comparison values of the first field.

Step 310: The decision circuit 240 generates a decision value according to the count value.

In Step 304, the pixel detector 210 calculates the difference (e.g. brightness value) between a target pixel 116 on the target scan line 30 and a plurality of comparing pixels on neighboring scan lines. For example, the pixel detector 210 can subtract the comparing pixel 126 on the scan line 40 from the target pixel 116 using the first subtracter 216, and subtract the comparing pixel 106 on the scan line 20 from the target pixel 116 using the second subtracter 218, and then send the results to the comparator 220.

Please refer to FIG. 1. The target pixel 116 and the comparing pixels 106, 126 are on the same vertical line of the frame 100, so that the result obtained by the first subtracter 216 and the second subtracter 218 represent the difference between the target pixel 116 and comparing pixels 106, 126.

In Step 306, the comparator 220 generates the comparison value corresponding to the target pixel 116 by the two differences received. In an embodiment, the two differences are not 0 (more than a threshold) and have the same positive/negative signs, the comparator 220 outputs a logic 1 signal (that is, a sawtooth artifact exists in the target pixel 116 and the comparing pixels 106, 126), otherwise the comparator 220 outputs a logic 0 signal.

Figure 5:
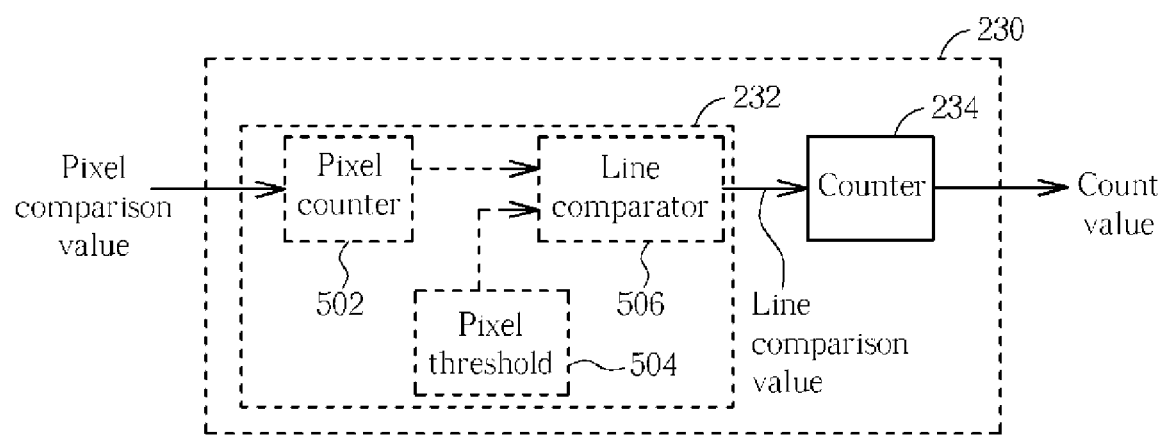
FIG. 5 is a schematic diagram of the counting device of FIG. 2.

In another embodiment, please refer to FIG. 5. The counting device 230 includes a line threshold 232, and a counter 234. The line threshold 232 comprises a pixel counter 502, a pixel threshold 504, and a line comparator 506. The pixel counter 502 counts the comparison values of all the target pixels on the line 30 of the first field. The line comparator 506 outputs a line comparison value which is logic 1 (that is, a sawtooth artifact exists in the line 30 and the lines 20, 40 of the second field) when the output of the pixel counter 502 is over the pixel threshold 504, otherwise the line threshold 232 outputs the line comparison value which is logic 0.

The counter 234 counts the output of the line comparator 506 to generate a count value $CNT\_F_n$ corresponding to the first field $F_n$. In another embodiment, the line threshold 232 can be omitted and the counter 234 is for counting the comparison values of all the pixels on the first field $F_n$.

Figure 6:
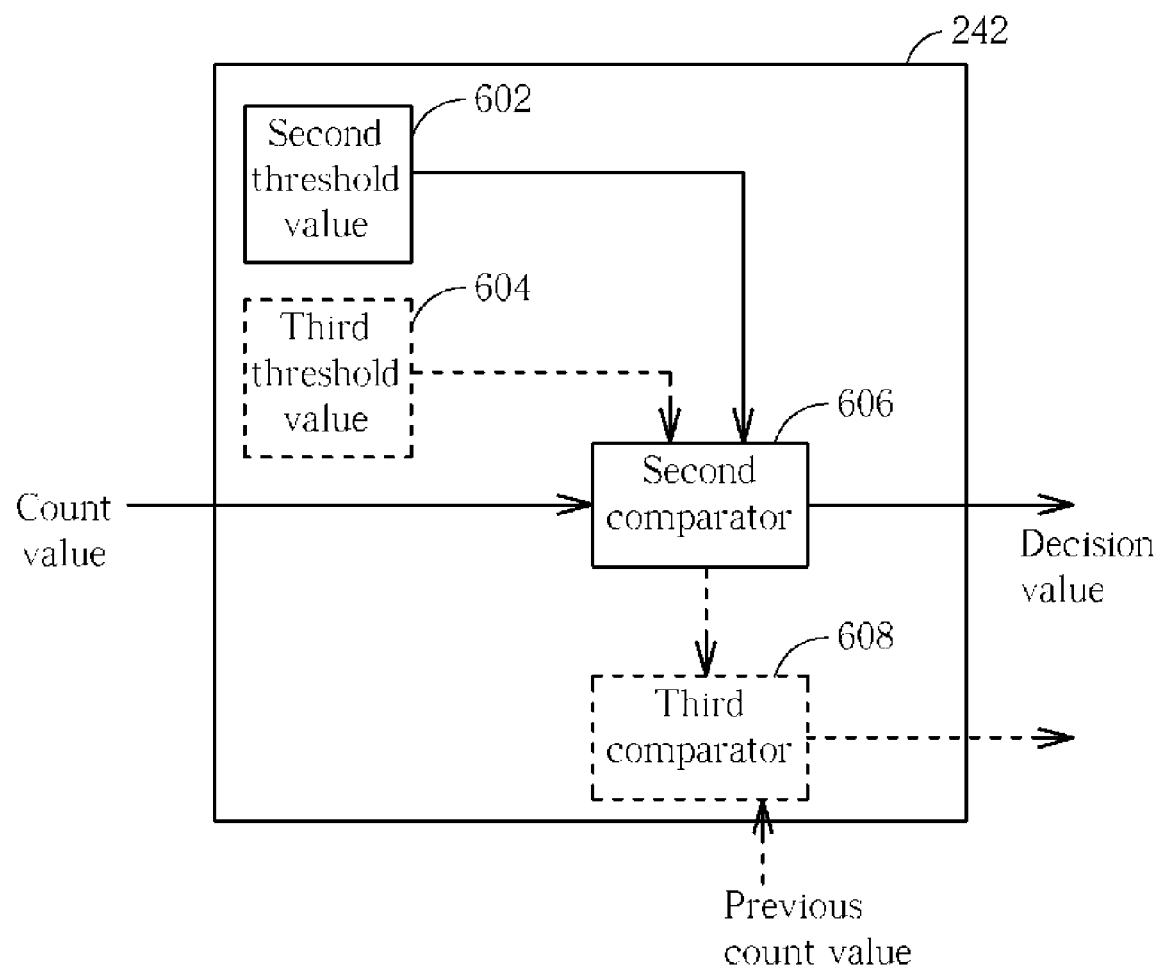
FIG. 6 is a schematic diagram of the operating unit of FIG. 2.

In Step 310, as known by a person skilled in the art, the decision circuit 240 can operate according to one threshold value, two threshold values, or other relating information if the decision value is located between the two threshold values. FIG. 6 shows an embodiment of the decision circuit of the invention. In the embodiment, the operating unit 242 of the decision circuit 240 receives the count value from the counter 234 and generates a decision value according to the count value and the previous count values stored in the register 244. The count values are the count values of three successive fields. The operating unit 242 uses the count value with the previous count values stored in the register 244 to generate the decision value, which represents whether field motion between the first field $F_n$ and the second field $F_{n-1}$, and also represents whether sawtooth artifact in the frame 100.

Figure 4:
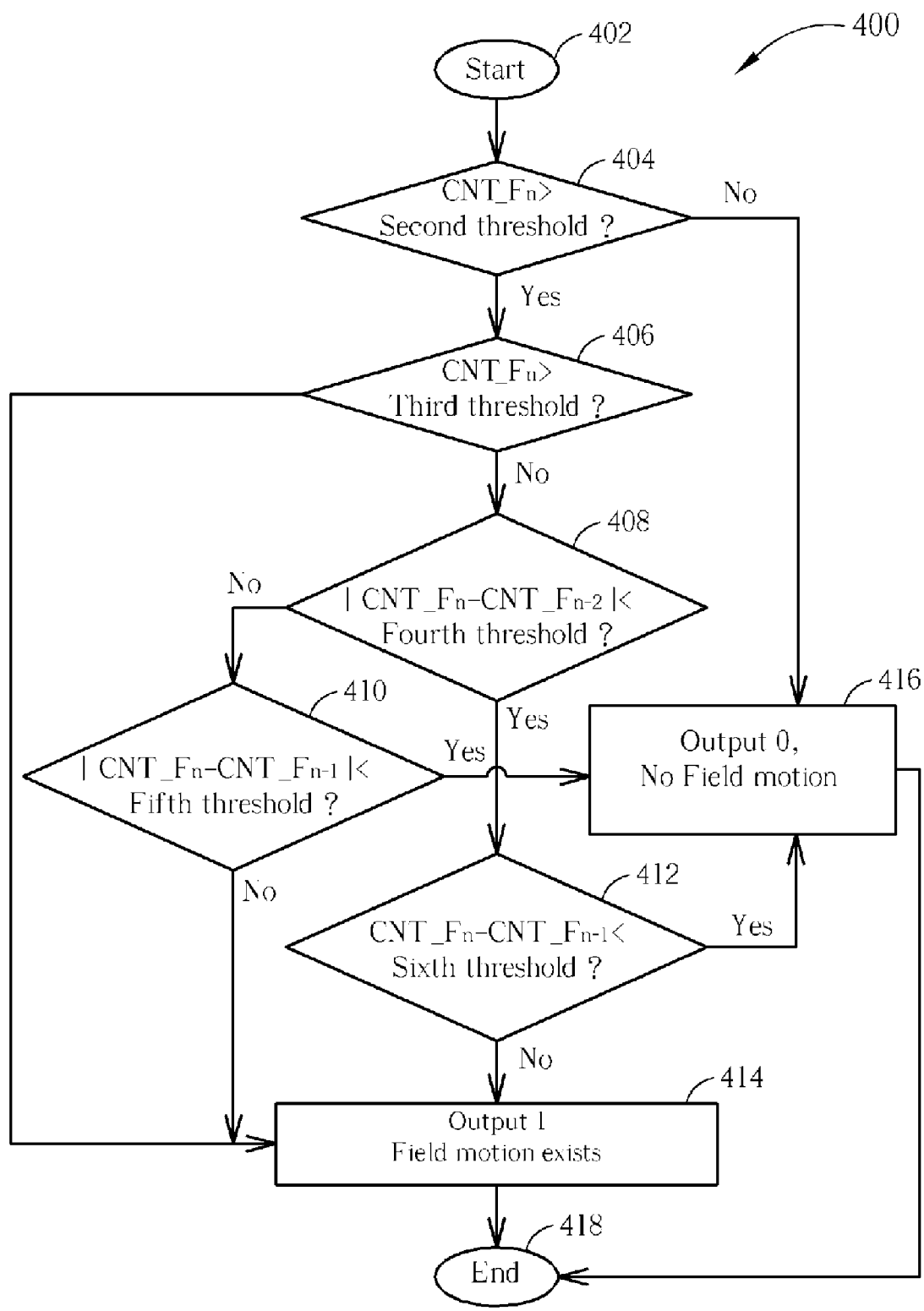
FIG. 4 is a flowchart of the decision circuit generating the decision value.

FIG. 4 shows a flowchart 400 of the decision circuit 240 generating the decision value using the count values (i.e. $CNT\_F_n$, $CNT\_F_{n-1}$, $CNT\_F_{n-2}$) as follows:

Step 404: The second comparator 606 determines whether the count value $CNT\_F_n$ is larger than a second threshold 602. If no, proceed Step 416.

Step 406: The second comparator 606 determines whether the count value $CNT\_F_n$ is larger than a third threshold 604. If yes, proceed Step 414.

Step 408: The third comparator 608 determines whether the absolute value of the remainder of $CNT\_F_n$ minus $CNT\_F_{n-2}$ is less than a fourth threshold. If yes, proceed Step 412.

Step 410: The third comparator 608 determines whether the absolute value of the remainder of $CNT\_F_n$ minus $CNT\_F_{n-1}$ is less than a fifth threshold. If yes, proceed Step 416.

Step 412: The third comparator 608 determines whether the remainder of $CNT\_F_n$ minus $CNT\_F_{n-1}$ is less than a sixth threshold. If yes, proceed Step 416, and if no, proceed Step 414. In the embodiment, the sixth threshold is negative.

Step 414: The decision circuit 240 outputs the decision value which is logic 1 to represent that there is field motion between the first field $F_n$ and the second field $F_{n-1}$ as well as sawtooth artifact.

Step 416: The decision circuit 240 outputs the decision value which is logic 0 to represent that there is neither field motion between the first field $F_n$ and the second field $F_{n-1}$ nor sawtooth artifact.

In another embodiment, the steps 408, 410, and 412 can be omitted.

The count value of each field relates to the change between the field and its previous field. Therefore, field sequence mode or so called film mode of the video influences the count value change among successive fields.

In an embodiment of the present invention, the operating unit 242 utilizes the count value change among the first field $F_n$ and its previous successive fields $F_{n-1}$, $F_{n-2}$ to determine whether there is field motion (and/or sawtooth artifact) between the first field $F_n$ and the second field $F_{n-1}$. In such a manner, the apparatus 200 of the invention can detect field motion (and/or sawtooth artifact) regardless of the format of video data (ex: NTSC, PAL, or other video data).

The steps described in the flowchart 400 are only an embodiment, a person skilled in the art can adjust parameters therein or steps or the sequence of steps.

In another embodiment, the two subtracters 216, 218 can be replaced with an edge detector respectively. For instance, the pixel detector 210 takes the target pixel 116 as the center of edge detection to find a first edge formed by the corresponding pixels on the line 20 and the target pixel 116, and a second edge formed by the corresponding pixels on the line 40 and the target pixel 116. When the comparator 220 finds the product of the slope of the first edge times the slope of the second edge is negative, it outputs logic 1 signal, and otherwise it outputs a logic 0 signal. The edge detector can find two edges formed respectively by the target pixel 116 and the pixels on the previous line, and the target pixel 116 and the pixels on the following line by edge detection, which is well known in the art. In this way, the comparator 220 generates the comparison value corresponding to the target pixel 116.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for detecting video data having a first field and a second field, comprising:
    a pixel detector for comparing a target pixel in the first field and a plurality of comparing pixels in the second field to generate a plurality of comparison results, and producing a comparison value corresponding to the target pixel according to the comparison results;
    a counting circuit coupled to the pixel detector for generating a count value according to the comparison values corresponding to the pixels in the first field; and
    a decision circuit coupled to the counting device, for generating a decision value according to the count value;
    wherein the counting circuit comprises:
        a pixel counter for summing the comparison values of the pixels on each scan line in the first field to generate a plurality of line summation values, each line summation value corresponding to a sum of the comparison values of one of the scan lines in the first field;

a line comparator for comparing the line summation value for each scan line in the first field with a first threshold value to generate a plurality of line comparison values, each line comparison value corresponding to one of the scan lines in the first field; and a counter for summing the line comparison values of all the scan lines in the first field to generate the count value.

2. The apparatus of claim 1, wherein the target pixel is located on a first line in the first field and the comparing pixels are located on a second line in the second field, and the first line neighbors on the second line when a frame is composed of the first field and the second field.

3. The apparatus of claim 2, wherein the decision value represents whether there is sawtooth artifact in a frame composed of the first field and the second field.

4. The apparatus of claim 2, wherein the decision value represents whether there is field motion between the first field and the second field.

5. The apparatus of claim 2, wherein the pixel detector comprises:

a first subtracter for receiving the target pixel and the comparing pixels on the first scan line and outputting a first difference;

a second subtracter for receiving the target pixel and the comparing pixels on the second scan line and outputting a second difference; and a comparator for receiving the first difference and the second difference and outputting the comparison value of the target pixel.

6. The apparatus of claim 1, wherein the decision circuit compares the count value with a second threshold to generate the decision value.

7. The apparatus of claim 1, wherein the decision circuit comprises:

an operating unit for producing the decision value according to the count value and at least one previous count value.

8. The apparatus of claim 7, wherein the decision circuit further comprises:

a storage unit for storing the at least one previous count value.

9. The apparatus of claim 1, wherein the pixel detector comprises:

a first edge detector for receiving the target pixel and a first part of the comparing pixels and outputting a first edge signal;

a second edge detector for receiving the target pixel and a second part of the comparing pixels and outputting a second edge signal; and a comparator for outputting the comparison value of the target pixel according to the first and the second edge signals.

10. A method for detecting video data comprising:

comparing a target pixel in a first field and a plurality of corresponding comparing pixels in a second field to generate a plurality of comparison results;

generating a comparison value corresponding to the target pixel according to the comparison results;

generating a count value corresponding to the first field according to the comparison values of the pixels in the first field; and generating a decision value according to the count value;
wherein generating the count value comprises:

summing the comparison values of the pixels on each scan line in the first field to generate a plurality of summing values, each summing value corresponding to a sum of the comparison values of one of the scan lines in the first field;

comparing the summing value for each scan line in the first field with a first threshold value to generate a plurality of line comparison values, each line comparison value corresponding to one of the scan lines in the first field; and summing the line comparison values of all the scan lines in the first field to generate the count value.

11. The method of claim 10, wherein the step of generating the decision value comprises:

comparing the count value with a second threshold value to generate the decision value.

12. The method of claim 10, wherein the decision value is generated according to the count value of the first field and at least one previous count value.

13. The method of claim 10, wherein the decision value represents whether there is field motion between the first field and the second field.

14. An apparatus for detecting video data having a first field and a second field, comprising:

a pixel detector for comparing a target pixel in the first field and a plurality of comparing pixels in the second field, and generating a comparison value corresponding to the target pixel according to a result of comparison;

a counting circuit coupled to the pixel detector for generating a count value according to the comparison values of the pixels in the first field; and a decision circuit coupled to the counting device, for generating a decision value indicating that there is no field motion between the first field and the second field when the count value is less than a first threshold, and for generating the decision value indicating that there is field motion between the first field and the second field when the count value is greater than the first threshold and a second threshold, the second threshold being greater than the first threshold;

wherein the counting circuit comprises:

a pixel counter for summing the comparison values of the pixels on each scan line in the first field to generate a plurality of line summation values, each line summation value corresponding to a sum of the comparison values of one of the scan lines in the first field;

a line comparator for comparing the line summation value for each scan line in the first field with a first threshold value to generate a plurality of line comparison values, each line comparison value corresponding to one of the scan lines in the first field; and a counter for summing the line comparison values of all the scan lines in the first field to generate the count value.

15. The apparatus of claim 14, wherein the pixel detector comprises:

a first edge detector for receiving the target pixel and a first part of the comparing pixels and outputting a first edge signal;

a second edge detector for receiving the target pixel and a second part of the comparing pixels and outputting a second edge signal; and a comparator for outputting the comparison value according to the first and the second edge signals.

16. The apparatus of claim 14, wherein the pixel detector comprises:

a first subtracter for receiving the target pixel and a first part of the comparing pixels and outputting a first difference;

a second subtracter for receiving the target pixel and a second part of the comparing pixels and outputting a second difference; and a comparator for outputting the comparison value according to the first and the second differences.

17. The apparatus of claim 14, wherein the decision circuit is further for generating the decision value indicating that there is field motion between the first field and the second field when the count value is greater than the first threshold but less than the second threshold, an absolute difference between the count value and a second previous count value is greater than a third threshold, and an absolute difference between the count value and a first previous count value is greater than a fourth threshold.

18. The apparatus of claim 14, wherein the decision circuit is further for generating the decision value indicating that there is no field motion between the first field and the second field when the count value is greater than the first threshold but less than the second threshold, the absolute difference between the count value and a second previous count value is greater than the third threshold, and the absolute difference between the count value and a first previous count value is less than the fourth threshold.

19. The apparatus of claim 14, wherein the decision circuit is further for generating the decision value indicating that there is field motion between the first field and the second field when the count value is greater than the first threshold but less than the second threshold, the absolute difference between the count value and a second previous count value is less than the third threshold, and a difference between the count value and a first previous count value is greater than a fifth threshold.

20. The apparatus of claim 14, wherein the decision circuit is further for generating the decision value indicating that there is no field motion between the first field and the second field when the count value is greater than the first threshold but less than the second threshold, the absolute difference between the count value and a second previous count value is less than the third threshold, and the difference between the count value and a first previous count value is less than the fifth threshold.

* * * * *